(No Model.)
A. W. NIBELIUS.
METHOD OF AND APPARATUS FOR SEPARATING GRAPHITE OR LIKE SUBSTANCES FROM CRUSHED ROCK.
No. 486,495. Patented Nov. 22, 1892.
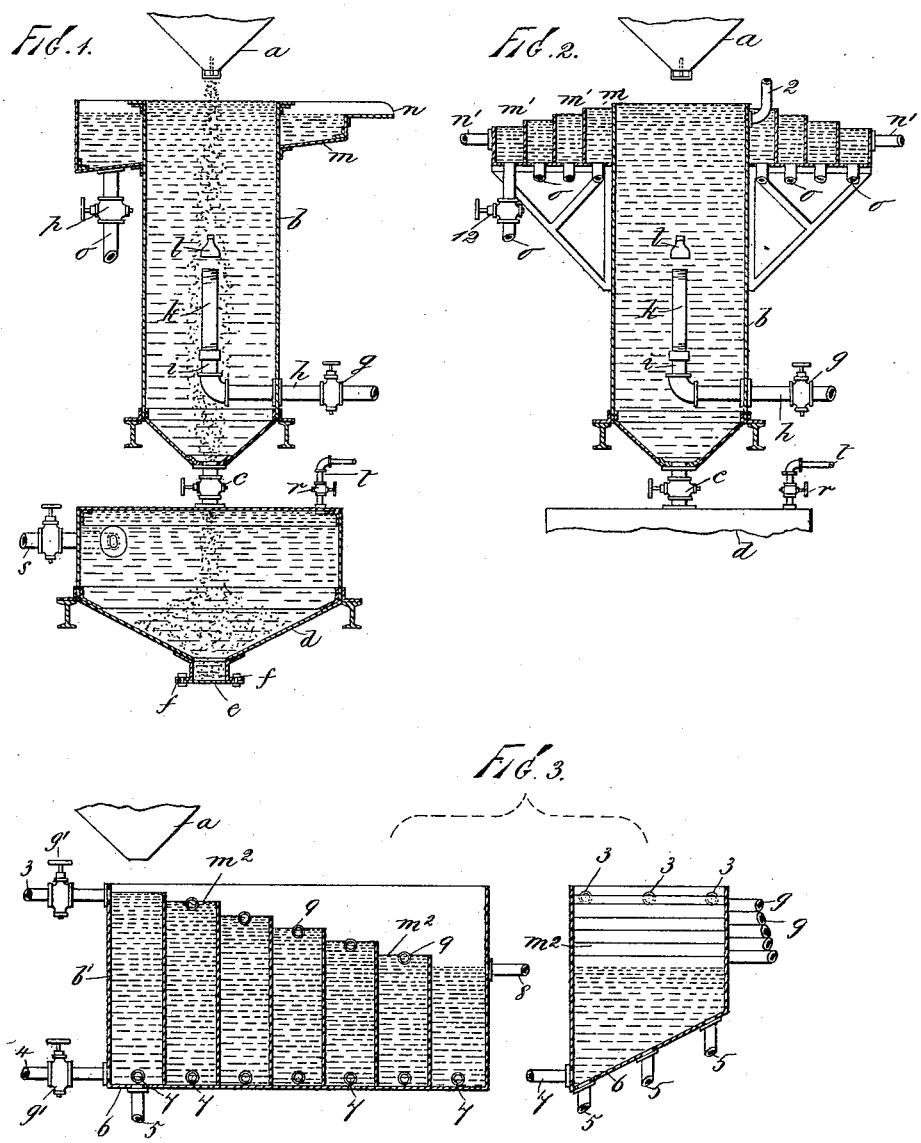
WITNESSES:
INVENTOR
Axel W Nibelius
BY
A. P. Thayer
ATTORNEY

UNITED STATES PATENT OFFICE.

AXEL W. NIBELIUS, OF HACKETTSTOWN, NEW JERSEY.

METHOD OF AND APPARATUS FOR SEPARATING GRAPHITE OR LIKE SUBSTANCES FROM CRUSHED ROCK.

SPECIFICATION forming part of Letters Patent No. 486,495, dated November 22, 1892.

Application filed October 16, 1891. Serial No. 408,864. (No model.)

*To all whom it may concern:*

Be it known that I, AXEL W. NIBELIUS, a subject of the King of Sweden, and a resident of Hackettstown, in the county of Warren and State of New Jersey, have invented certain new and useful Improvements in Methods of and Apparatus for Separating Graphite and Like Substances from Crushed Rock, of which the following is a specification.

My invention consists in an improved method of and in apparatus for separating graphite and like substances from crushed rock, the manner and mode of which is that a falling body of dry and crushed rock containing graphite meets a moving body of water or other liquid substance at the surface of the same, on which the flakes of graphite or other substance not absorbing water nor adhering to it are floated off and escape by an overflow, while the water-absorbing rock particles sink in the water, and are thereby separated. The falling crushed rock may meet an upwardly-flowing stream at the surface of the water in the tank and be floated away to the overflow in all lateral directions, which is the preferable way, or it may meet a laterally-flowing surface only, or the same and an upwardly-flowing stream also.

My invention is distinguished from those hydraulic processes grounded on the laws of difference in specific gravity and different forces of currents and in which the material is treated in suspension, of which there are many, in which it would be impossible to separate the substances so near each other in specific gravity as graphite and rock are, both being of a specific gravity of 2.4. It is the law of capillary repulsion that governs this method, graphite being repulsive and not adhering to water, while rock is adherent thereto, so the graphite naturally floats on the surface of the water and the rock sinks therein.

In the accompanying drawings, Figure 1 is a sectional elevation of apparatus such as may be used for causing the falling graphite to meet an upwardly-flowing stream of water. Fig. 2 is a sectional elevation of apparatus adapted for both an upward and a laterally moving current, and Fig. 3 represents longitudinal and transverse sections of apparatus for carrying out the process with horizontally-flowing streams.

Referring to the apparatus of Fig. 1, the dry rock containing graphite or minerals crushed to a desired fineness is put into the hopper $a$ and from there fed in a steady stream to meet the upward-moving body of water in vessel $b$, at the upper edge of which the water overflows into pan $m$, carrying off the flakes of graphite. The water-absorbing particles sink through the upward-moving column of water to the bottom of the vessel $b$ and through valve $c$ down in the storage-vessel $d$, which is closed with a manhole-cover $e$, kept in position by bolts $f$. Said storage-vessel $d$ has a water-supply pipe $s$ and vent-pipe $t$, both having stop-valves. The vertical and upward-moving stream of water is produced by letting water of some pressure run through valve $g$ and pipe $h$ up through pipes $i$ and $k$. On pipe $k$ a nozzle $l$ can be screwed in case the nature of the materials treated require to meet a sharp and contracted stream of water. The parts $l$, $k$, and $i$ are so connected that they can be detached from each other and from $h$ in case the issue of the stream of water needs to be deeper down in the vessel $b$. The water coming through these pipes is with pressure forced upward in the center of vessel $b$, thereby causing a continuous stream of water to flow out above the nozzle of the pipe, leaving the water below comparatively still and undisturbed. The pressure and velocity of this central stream of water are to be varied according to the different nature of the materials used and can be regulated by the valve $g$. A pressure-gage may be used as a guide by which to regulate the same.

The manipulation of the apparatus when used for separating graphite from rock is as follows: The manhole at bottom of vessel $d$ is closed by plate $e$. Valve $r$ is open and valve $c$ is open. Water is then allowed to flow through valve $g$, filling up first vessel $d$ and later vessel $b$. When $d$ is full of water, which is observed by water coming out of pipe $t$, valve $r$ is then closed. The water then fills and overflows vessel $b$ at the top, where it runs into the concentric pan $m$ and out through the overflow $n$. The stream of water is so regulated by the operator that it has the desired velocity for the successful separation of the materials in use. Then the rock in the mass of which the crystals of graphite have been liberated by crushing is fed in a stream from hopper *a*. When the materials strike the body of water which is moving radially from the center of vessel *b*, a separation takes place. The graphite is carried off on the water's surface to pan *m*. Some of the accompanying rock will settle to the inclined bottom of this pan, where a discharge-pipe *o* is connected, having a stop-valve *p*, through which the matters deposited there may be discharged. The graphite is carried off through overflow *n* to settling-tanks, where any small particles of rock that may have been carried off will settle down to the bottom, and the graphite can be skimmed off from the surface or allowed to settle. The rock in the stream from hopper *a* will absorb the water and rapidly sink to the bottom of vessel *d*, notwithstanding the lifting power of the stream of water.

When vessel *d* is filled with rock, sand, or heavy minerals, the valve *c* is closed and valve *r* opened, and also lid *e* of the manhole, and the sediment allowed to be carried off to the waste heaps or to the floor for further treatment, as the case may be. When *d* is emptied, lid *e* is fastened and water run in through pipe *s*, so that the vessel is again filled, which is shown, when water runs out through valve *r*. Meanwhile the materials continue to run from hopper *a* and the rocky parts settle to the bottom of vessel *b*. After vessel *d* has been emptied and again filled with water the valve *c* is then opened and what sediment has collected in the bottom of *b* will sink down in vessel *d*, and the process of separating and discharging the sediment goes on thus continually without disturbing the overflowing water-level of vessel *b*.

The apparatus of Fig. 2 and mode of operation are substantially the same as in Fig. 1, except that a laterally-flowing stream may also be admitted at one side of the top of the vessel *b* through the pipe 2, and the pan is divided into several successively-lower concentric sections *m'*, furnishing a series of overflow-passages for extending and graduating the separating process, with escape-passages *n'* for the graphite and with a discharge-pipe *o* and stop-valve *p* to each section for removal of the crushed rock.

The apparatus of Fig. 3 is also adapted for the employment of a laterally-flowing surface stream only or both a vertical and lateral stream, provision being made to admit the water to tank *b'* at the surface through pipe 3 and also at and near the bottom through pipes 4 5, either or altogether, as preferred, said pipes being provided with stop-valves *g'* to control the inlet through them. The tank *b* has in this example a sloping bottom 6, with a discharge-pipe 7 for the discharge of the crushed rock from time to time, and the overflow passes on through a series of successively-lower receptacles $m^2$, from which the graphite is finally floated off through passage 8, and each receptacle $m^2$ has an escape-passage 9 for graphite also, and also a pipe 7 at the lower side of the inclined bottom for the discharge of the crushed rock.

My invention is distinguished from those cases in which substances of different specific gravities are introduced below the surface through still water and caused to meet a contracted upward-flowing current, on which the lighter particles are carried upward from the meeting-point with said current and discharged at the top of the water column, as in the patents to Stadtmuller, No. 22,138, and Quimby, No. 66,736, in that I cause the crushed material to meet the current of upward-flowing water on the surface and within the surrounding body of comparatively-still water, on the surface of which the graphite is left unaffected by any influence of the upward current after its impact, which facilitates separation in the first place and floats quietly away with the overflow, and it is also distinguished by the same conditions from those machines in which particles of lighter specific gravity are washed away from the heavier bodies by centrifugal currents generated by rotating appliances and forced away to or through the discharge passage or passages thereby, as in the patents to Robinson, No. 344,545, and Booream, No. 353,775.

If this invention were grounded on the laws of difference in specific gravities, then it would be impossible to separate two substances so near to each other in specific gravity as graphite and rock are, both being of a specific gravity of 2.4, as before stated.

I claim—

1. The process of separating graphite and like substances from the crushed rocks, which consists in causing a falling body of dry and crushed rock to meet a vertically and upwardly moving body or stream of water at the surface of and within a surrounding body of comparatively-still water, on which surface the flakes of graphite or other substance not absorbing water are separated and are floated off on the overflowing water, while the water-absorbing particles are precipitated in the water, substantially as described.

2. The combination of the vessel *b*, having an open top, the overflow receiving and discharging pan *m* thereat, the water-inlet and upwardly-discharging pipe *h*, and the discharge-passage and stop-valve at the bottom of said vessel, said vessel *b* and pipe *h* adapted to contain a body of comparatively-still water surrounding the upwardly-discharged current from said pipe *h*, substantially as described.

3. The combination of the vessel *b*, having an open top, the overflow receiving and discharging pan thereat, said pan having a sloping bottom adapted to collect the matters precipitating in said pan, a discharge-pipe and stop-valve at the lower side thereof, and the water-inlet and upwardly-discharging passage and stop-valve at the bottom of said vessel, said vessel and upwardly-discharging inlet adapted to contain a body of comparatively-still water surrounding the upwardly-discharged current from said inlet, substantially as described.

4. The combination of the vessel $b$, having the open top, the overflow receiving and discharging pan thereat, the water-inlet and upwardly-discharging pipe $h$, having one or more detachable sections for regulating the flow of the water, and the discharge-passage and stop-valve at the bottom of said vessel, substantially as described.

5. The combination of the vessel $b$, having the open top, the overflow receiving and discharging pan thereat, the water-inlet and upwardly-discharging pipe $h$, the discharge-passage and stop-valve at the bottom of said vessel, and the receiving and discharging vessel $d$ below, connected with said discharge-passage and having pipes and valves for discharging and refilling with water without interruption of the separating process in vessel $b$, said refilling-pipe being independent of the inlet for supply of vessel $b$, substantially as described.

Signed at Hackettstown, in the county of Warren and State of New Jersey, this 3d day of October, A. D. 1891.

AXEL W. NIBELIUS.

Witnesses:
GUSTAF M. WESTMAN,
ARTHUR M. SAUNDERS.